United States Patent
Colet

(10) Patent No.: US 6,761,370 B2
(45) Date of Patent: Jul. 13, 2004

(54) TRANSPORT DEVICE FOR HAULING A LOAD

(76) Inventor: Ralph Colet, 38021 Cherry St., Newark, CA (US) 94560

(*) Notice: Subject to any disclaimer, the term of this patent is extended or adjusted under 35 U.S.C. 154(b) by 256 days.

(21) Appl. No.: 09/992,397

(22) Filed: Nov. 13, 2001

(65) Prior Publication Data

US 2003/0090077 A1 May 15, 2003

(51) Int. Cl.$^7$ .................................................. B60P 3/22
(52) U.S. Cl. ..................... 280/124.1; 280/830; 280/839
(58) Field of Search ..................... 280/124.1, 124.158, 280/124.157, 124.159, 124.16, 830, 831, 833, 834, 837, 838, 839, 7, 783, 788

(56) References Cited

U.S. PATENT DOCUMENTS

| | | | | |
|---|---|---|---|---|
| 2,772,010 A | * | 11/1956 | Buehring | 285/93 |
| 3,409,307 A | * | 11/1968 | Higginbotham | 280/839 |
| 3,428,335 A | * | 2/1969 | Clark | 280/479.1 |
| 3,455,475 A | * | 7/1969 | Suteau | 414/787 |
| 3,578,348 A | * | 5/1971 | Reinke | 280/839 |
| 3,798,730 A | * | 3/1974 | Morf | 29/896.32 |
| 3,860,252 A | * | 1/1975 | Martens et al. | 280/2 |
| 4,202,564 A | * | 5/1980 | Strader | 280/678 |
| 4,283,066 A | * | 8/1981 | Brown et al. | 280/838 |
| 4,325,560 A | * | 4/1982 | Hirvonen | 280/838 |
| 5,042,840 A | * | 8/1991 | Rieple et al. | 280/830 |
| 5,593,070 A | * | 1/1997 | Steadman | 222/608 |
| 5,755,264 A | * | 5/1998 | Richards et al. | 137/899 |

* cited by examiner

Primary Examiner—Kelly Campbell
(74) Attorney, Agent, or Firm—Robert Samuel Smith

(57) ABSTRACT

A transport device for hauling a load having a front axle with a pair of wheels and a rear axle with a pair of wheels. Four vertical hydraulic cylinders are provided, each cylinder having a bottom end supported on one of the axles adjacent a wheel, respectively. A pair of yokes are provided. Each yoke has one end supported by the ram extending from the top of one cylinder mounted on the front axle and the other end supported by the ram extending from the top end of a cylinder on the rear axle so that the yokes are parallel to one another and extend from front to rear of the device. A container containing the load is suspended from the pair of yokes. In one version, the device is coupled for transport to a truck. In another version, an engine is mounted on a cantilever frame extending from the rear of the truck controlled by operators in a cab mounted on the front end of the device. In another version, the device has a tongue extending from the front axle and attachable to a truck tractor.

36 Claims, 11 Drawing Sheets

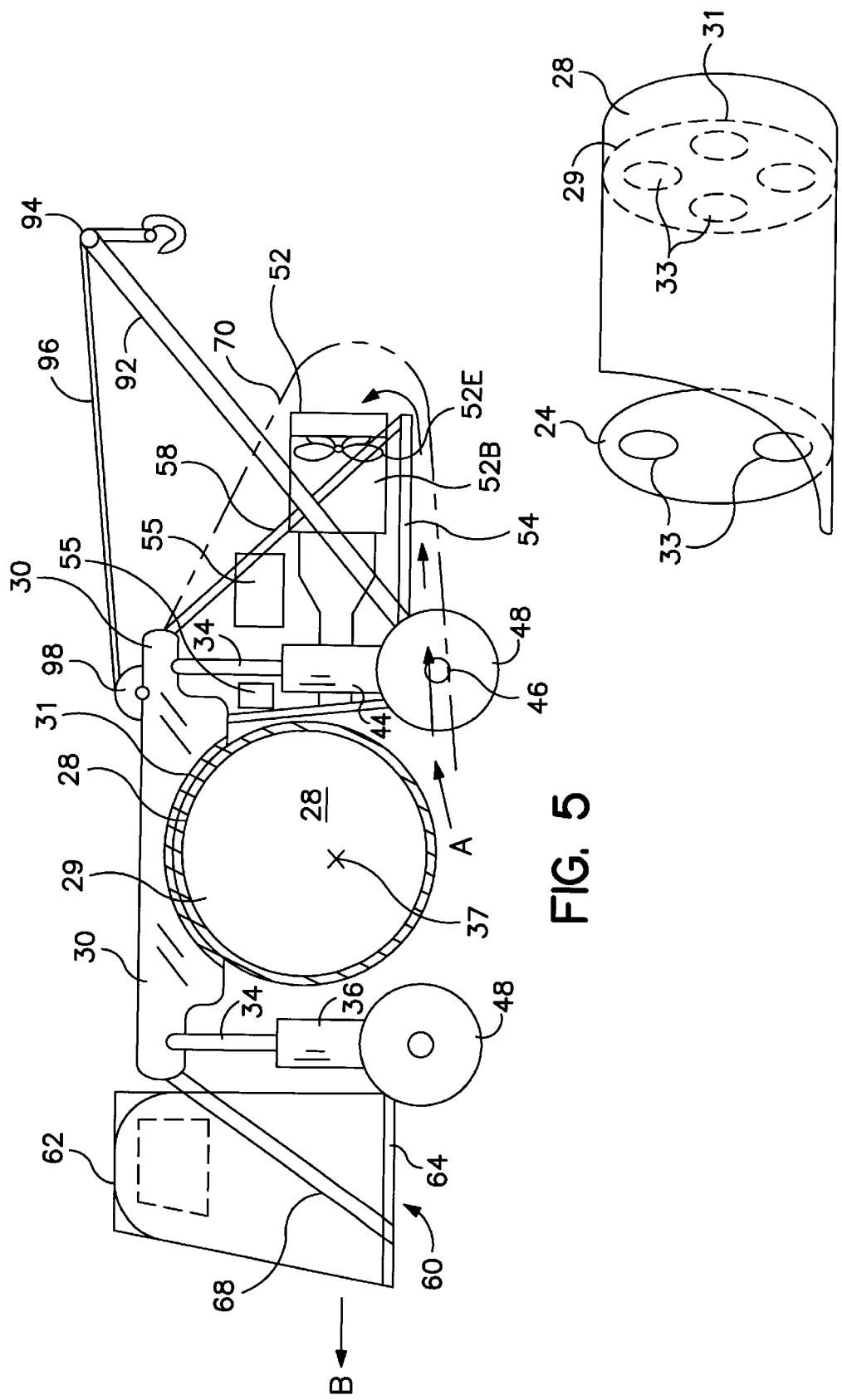

TRANSPORT DEVICE FOR HAULING A LOAD

FIELD OF THE INVENTION

This invention relates to the construction of trucks such as are used for carrying thousands of gallons of liquids and particularly to a truck in which the bed and cab of the truck are supported by a suspension system.

BACKGROUND AND INFORMATION DISCLOSURE.

There is a demand for trucks that are used for carrying large quantities of liquids (in excess of 4000 gal). These liquids include water such as for transporting water to the site of a fire, fuels, water, etc.

The standard design approach to construction of trucks for these applications is illustrated in the assembly view of FIG. 1. There is shown a tank 10 poised for mounting on top of a "ladder" frame including beams 12 and cross members 14. The ladder frame is secured by leaf springs 16 (one for each wheel) mounted on the truck front and rear axles 20.

As shown in FIG. 1, the typical tank 10 is oblong with an axis extending from the front end to the rear end of the truck bed.

This conventional arrangement shown in FIG. 1 having several inherent limitations.

One limitation is that the elongated ladder frame must have a thickness (weight of the frame) sufficiently great to prevent excessive flexion of the frame. This requirement imposes a lower limit on the weight of the pair of elongated beams constituting the ladder frame.

A second limitation is that the arrangement of the tank and motor on top of the frame on top of leaf springs on top of the axle mandates that the center of gravity of the loaded truck is at a height above the ground that the tendency of the truck to roll over becomes an important consideration in terms of safe driving practices such as speed around curves, allowable tilt when driving on road beds that are not level, etc.

A third limitation is the amount of liquid that can be pumped out of the tank when the tank is tilted on an incline or decline. When the truck is on a 25 degree slope (incline) only about 85% of the liquid can be pumped out of the tank.

A fourth limitation is the inconvenience of performing maintenance operations particularly operations requiring temporarily dismounting of the motor that is located at an elevated height on top of the frame.

A fifth limitation is the inherent characteristic that a large fraction of the truck structure, the tank, makes no contribution to the structural strength of the truck and is subject to severe flexion because of its elongated oblong shape. Because the tank makes no contribution to the strength-rigidity of the overall truck structure, the tank is normally made as light as practical. Polypropylene tanks, made from ⅜" thick sheet, is often the material of choice. With such tanks, no consideration of any contribution to overall structural strength of the truck assembly is considered.

A sixth limitation is operative when applied to Military uses of the truck according to which the overall height and length and width of the truck and weight when fully loaded are all limited by the requirement that the truck be capable of being transported on an airplane, particularly the air force C130. The more weight that is required to build the truck, the less weight of liquid can be accommodated as the truckload.

A number of references in the patent literature exemplify approaches to the problems listed in the foregoing paragraphs.

For example, U.S. Pat. No. 5,630,625 to Shaw discloses two tanks mounted on a ladder frame and having tag wheels that initially support the rear end of the truck but are automatically raised when the rear tank has been emptied.

U.S. Pat. No. 4,283,066 to Brown et al discloses a tank supported partially between the parallel members of the ladder frame comprising the truck bed.

U.S. Pat. No. 4,325,560 to Hirvonen discloses a tank comprising an elongated tubular shell whose length is substantially the length of the truck bed that functions both as a container for the fluid and is sufficiently rigid to function as the supporting frame of the truck. The front and rear axles are suspended from respective ends of the tank by links (coil springs and air springs positioned between the bottom side of the tank and the axles.

U.S. Pat. No. 5,593,070 to Sreadman discloses a cylindrical fiber glass tank supported on a metal frame between the pair of elongated members forming the frame of the bed.

None of these disclosures apply the principles adapted by the present invention to overcome the limitations of the present state of the art.

SUMMARY OF THE INVENTION

It is an object of this invention to provide a vehicle for carrying bulky loads and especially fluid loads such as water, fuels, sand, etc. It is a particular object that the vehicle has fewer tendencies to tip over when carrying the load on uneven terrain such as the side of a hill or in areas where the vehicle might encounter a ditch. In achieving this object it is inherent in the construction of the invention that the loaded vehicle have a center of gravity that is lower than is the case for vehicles of similar load carrying capacity.

An advantage of this inherently limited reduction of the overall height of the vehicle is greater ease in dimensioning the vehicle so that it can be loaded onto a transport plane.

Another object is that the ratio of weight of the loaded truck to the unloaded truck be inherently substantially higher than ratios characteristic of trucks of the present state of the art.

It is contemplated that the goal of reduced weight be achieved without sacrificing strength in terms of load carrying capacity.

The design of this vehicle is characterized by minimizing bending moments that otherwise lead to at least unsafe driving conditions and, at worst, to failure of structural members.

It is a further object that the principles of the invention are adaptable to construction of a truck that is modular so as to provide convenient access to and/or replacement of the motor and/or the cab.

This invention is directed toward a transport device for carrying a load in a carrier section in which a container (e.g., a tank) is hung on a hanger structure that is supported by a plurality of vertical hydraulic cylinders. The carrier section typically has a forward and a rearward axle but, in other versions, the truck has an additional axle and pair of wheels parallel and adjacent to front and/or rear axle. The number of cylinders depends on the number of wheels, being one cylinder for each wheel.

In one embodiment, the truck comprises a pair of cylinders supported on a front axle and another pair of cylinders supported on a rear axle (with a wheel on each end of the respective axle). The lower end of each hydraulic cylinder is secured to one axle close to one of the wheels respectively. The upper ends of the cylinders support a pair of hanger members. The container is attached to and hangs below a pair of hanger members.

Each hanger member is a yoke fashioned from a panel providing that its vertical dimension is very large compared to its horizontal dimension (thickness of the panel) and is therefore very favorable for resisting vertical flexion. Furthermore, the load. Hanging from the panel exerts a tensile load parallel to the surface of each panel so that there is no tendency for the panel to buckle.

The construction of the yoke therefore provides that a substantially reduced amount of material is required compared to construction of the prior art in which a heavy pair of beams is positioned under the load In one embodiment, the container is a cylindrical tank with a horizontal axis vertical to the direction of travel. Each yoke is one of a pair of vertical panels (one at each end of the cylindrical tank) cut out to form the pair of yokes that straddle the cylindrical tank. Each yoke is welded near one end of the tank opposite the other yoke at the other end of the cylindrical tank. A pair of baffles is welded to the inside of the tank. Each baffle is coplanar with the yoke outside the tank. Each yoke and baffle constitute a beam having a width comparable to the diameter of the tank. Resistance to bending (flexion) of the beam is thereby optimized. Each baffle has openings that permit free flow back and forth of the fluid inside the tank.

The rear end of the carrier section has a cantilever that extends away from the carrier section and supports the engine. The engine includes the transmission coupled to the motor coupled to the radiator. The cantilever for the engine includes a pair of horizontal beams, each having one end abuttedly attached to the rear axle and the other end secured to one end of one of a pair of oblique members whose other end is secured to the nearest end of one of the yokes. The other oblique member is similarly attached to the other horizontal beam and other yoke. A pair of vertical hangers are suspended from the forward end of the yokes and have lower ends secured to the transmission to provide additional strength to supporting the engine. This arrangement provides that most of the weight of the engine is transferred as a tensile force to the oblique members and the vertical hangers. Since the force on these members is tensile, the total weight of the structure supporting the engine (the cantilever) is much smaller than constructions of the standard art where the engine is supported on top of a pair of beams.

The cab section is a unitary form module that is fastened onto the front end of the carrier section In another version, a cantilever support is positioned on the front end of the carrier section for carrying the cab module. Containing the operators and truck crew.

In another embodiment of the invention, the carrier section has no cantilever sections for carrying a cab or engine but instead has a tongue extending in the forward direction from one axle. The free end of the tongue is attachable to a motorized vehicle.

The primary links connecting the motor, cab and tanks to the yokes are all under tensile stress so that there are no bending moments that would tend to buckle the links subject to the weight of the engine and tanks. This feature provides that the links be lighter than would be required if the links were subject to compressive force.

The primary compressive forces are exerted by the vertical hydraulic cylinders. Location of the lower ends of the cylinders secured to the axles close to the wheels ensures that there are generated no bending moments that would require extra material (greater weight for adequate strength.

Hydraulic pressure is maintained by a pump that distributes hydraulic fluid through a valve block to each of the cylinders. Hydraulic fluid pressure through the branches of the valve block to the respective cylinder is computer controlled to respond to measure of pressure by sensors, one sensor measuring pressure in a respective cylinder. The sensors respond to adverse driving conditions such as tilting on high crown uneven terrain and adjust hydraulic pressure accordingly.

A baffle-scoop under the rear end of the truck and sides of the hood reverse direction of flow of cooling air flowing rearward under the truck (as the truck moves) so that the air finally flows in the forward direction and cools the engine, then through a radiator and out through louvers on top of the engine hood. A radiator fan for increasing air flow is provided that is temperature controlled to turn on when the flow of air is insufficient to maintain the required operating temperature such as when the truck is not moving.

The foregoing summary has highlighted features, aspects and advantages of the present invention. The invention is further explained by the following description of what I presently believe to be the best mode for carrying out the invention illustrated by drawings to which are appended claims which define the scope of the invention.

BRIEF DESCRIPTION OF THE DRAWINGS

FIG. 5 is a side view illustrating the compressive and tensile stress and the airflow pattern.

FIG. 6 shows the baffles inside the tank.

DESCRIPTION OF A BEST MODE

Figure 2:
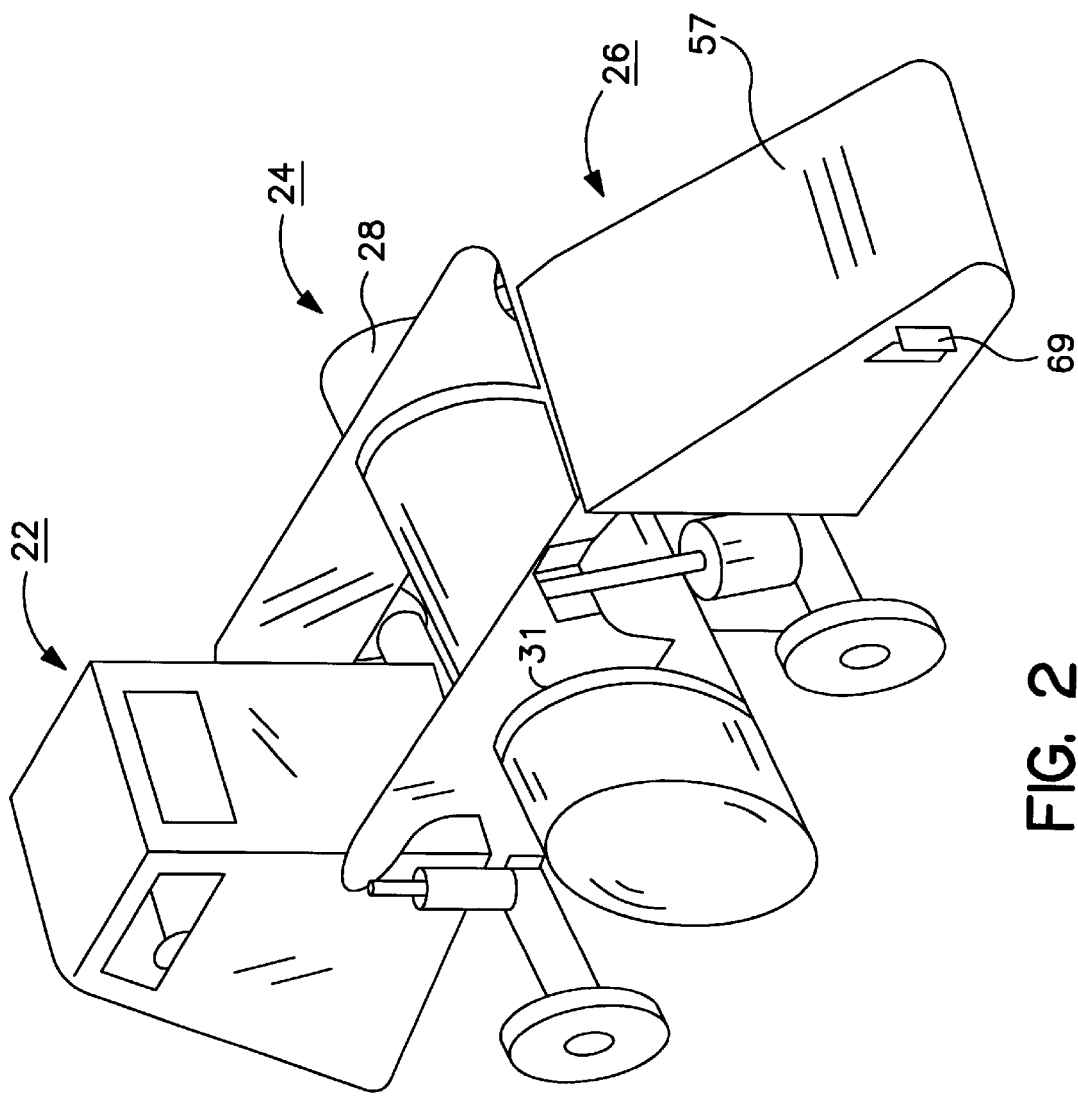
FIG. 2 is an assembly view of the truck of this invention.

Turning now to a description of the drawings, FIG. 2 is a perspective view of the tank truck of this invention. There are shown a cab section 22, a carrier section 24 and an engine section.

Figure 3:
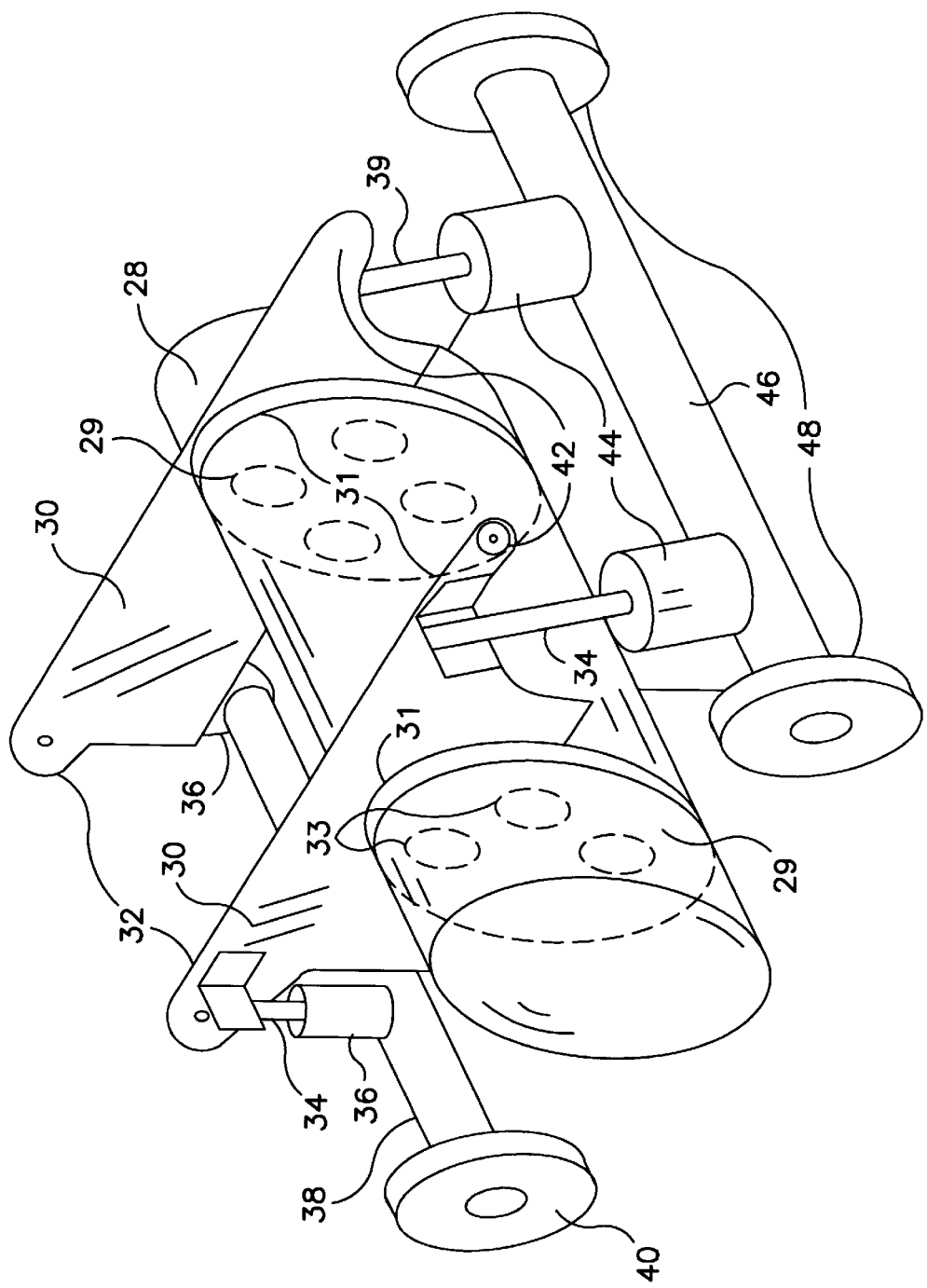
FIG. 3 shows the carrier section of the truck.

One embodiment of the carrier section is presented to best advantage in FIG. 3. The carrier section includes a container and a pair of hanger members 30.

In FIG. 3, the container 28 is a cylindrical tank 28. The hanger members 30 are a pair of panels cut as yokes 30 and positioned to straddle the tank 28. One yoke 30 is close to one end of the tank opposite the other yoke 30 close to the other end of the tank 28.

As shown in FIG. 3 and to better advantage in the cutaway view of FIG. 6, the tank contains a pair of baffles 29 that are welded to the inside of the tank 28 coplanar with the yokes 30. Each baffle has openings 33 to permit free flow of the fluid inside the tank. 28.

Each yoke 30 is welded along fine 31 to the outside of tank 28.

The forward ends 32 of the yokes 30 are engaged with the rams 34 of a forward pair of vertical hydraulic cylinders 36. The lower ends of the cylinders 36 are supported on a front axle 38. Each cylinder 38 is proximal to one of the front wheel. The lower end of the other cylinder is supported on the front axle proximal to the other front wheel.

Figure 4A:
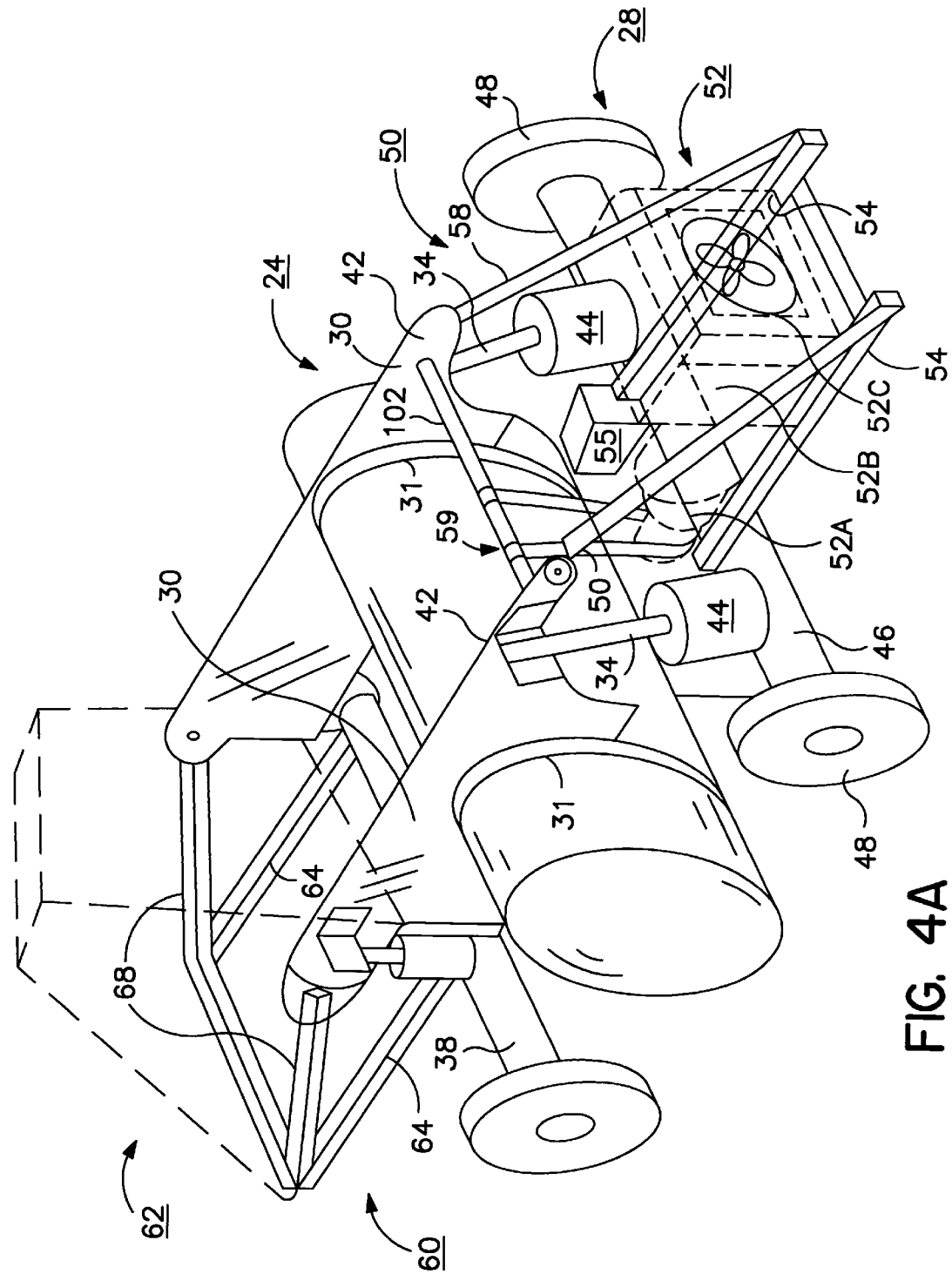
FIGS. 4A,B,C show the carrier section including the pump system and the cantilever attachment for supporting the engine on one end and the cantilever attachment for supporting the cab on the other end.

A pump system 55 is shown in FIGS. 4A, B for pressurizing the cylinders. The components of the pump system are illustrated to best advantage in FIG. 4C and include a pump 55A. A valve block 55B with a plurality of valves, (four are shown) which apply pressure of hydraulic fluid from the pump to each cylinder respectively controlled by a computer 55C in response to a sensor 55D sensing pressure at a respective cylinder The rearward ends 42 of the yokes 30 are engaged with the upper ends of a rearward pair of vertical hydraulic cylinders 44. The lower ends of the rearward cylinders 44 are supported on a rear axle 46, the lower end of one rearward cylinder is supported on the rear axle proximal to one rear wheel 48. The lower end of the other rear cylinder 44 is supported on the rear axle 46 proximal to the other rear wheel 44.

Figure 1:
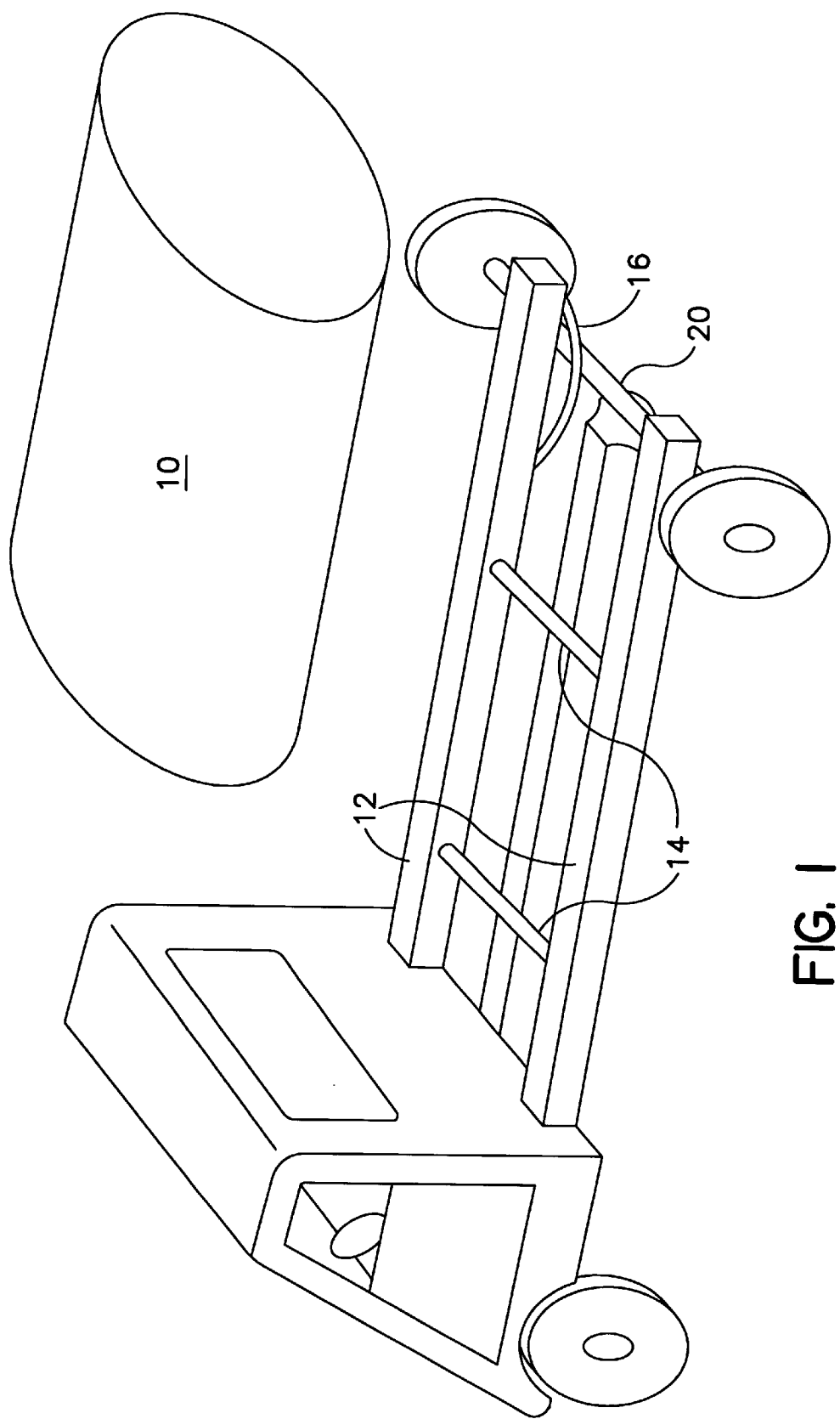
FIG. 1 shows the typical construction of a truck according to the prior art.

FIG. 4A shows details of the engine section 26 comprising a cantilever 50 for supporting the engine 52. The cantilever 50 extends away from the carrier section 24. The engine 52 is shown in phantom and includes the transmission 52A coupled to the motor 52B coupled to the radiator 52C. The cantilever 50 for the engine includes a pair of horizontal beams 54, each having one end abuttedly attached to the rear axle 46 and the other end secured to one end of one of a pair of oblique members 58 whose other end is secured to the nearest end of one of the yokes 30. The other oblique member 58 is similarly attached to the other horizontal beam 54 and other yoke 30. This arrangement provides that most of the weight of the engine 52 is transferred as a tensile force to the oblique members 58 Since the force on the oblique member is tensile, the total weight of the structure supporting the engine (the cantilever) is much lighter than the weight of constructions of the standard art where the engine is supported on top of a pair of beams as shown in FIG. 1.

Figure 4B:
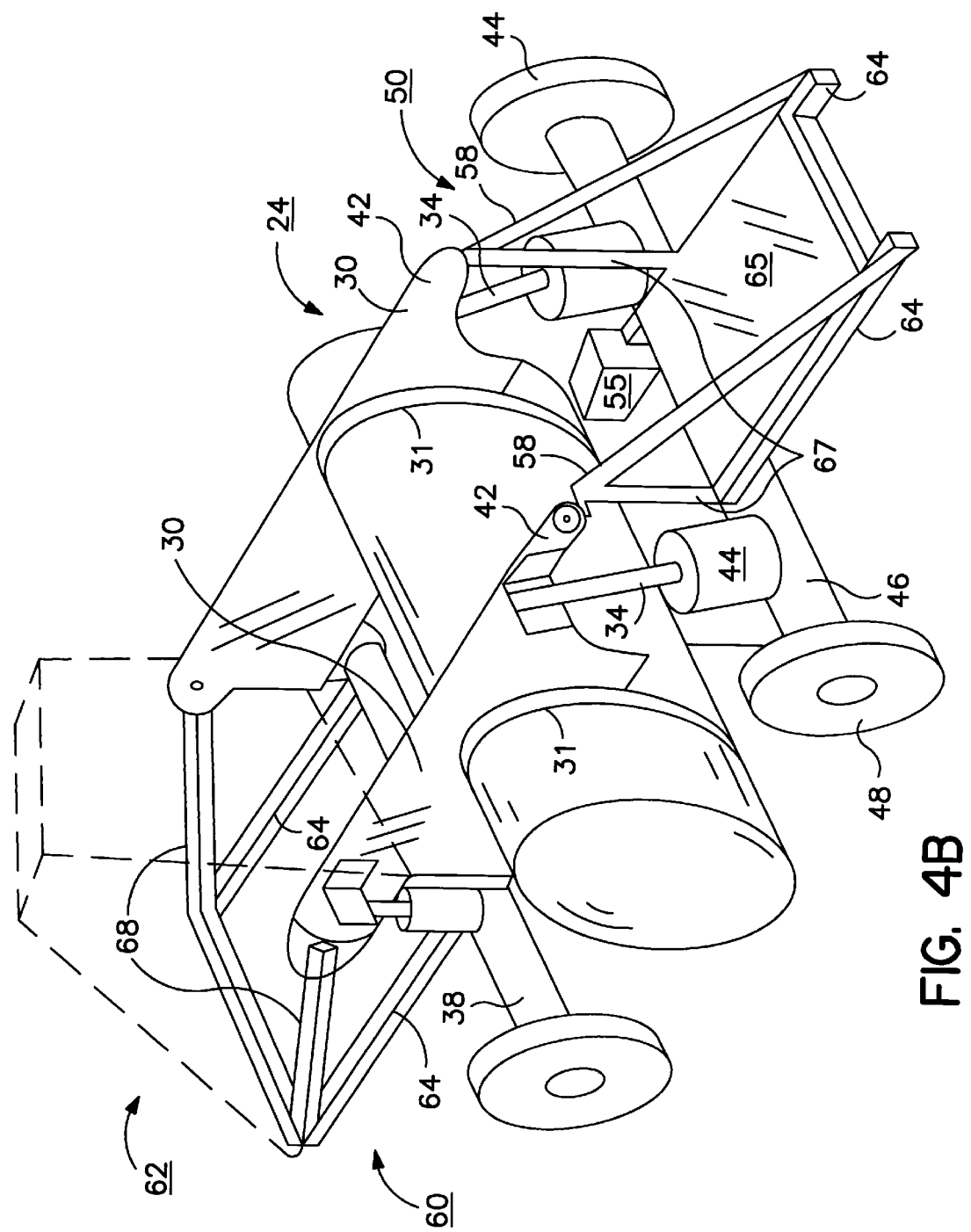
Figure 4C:
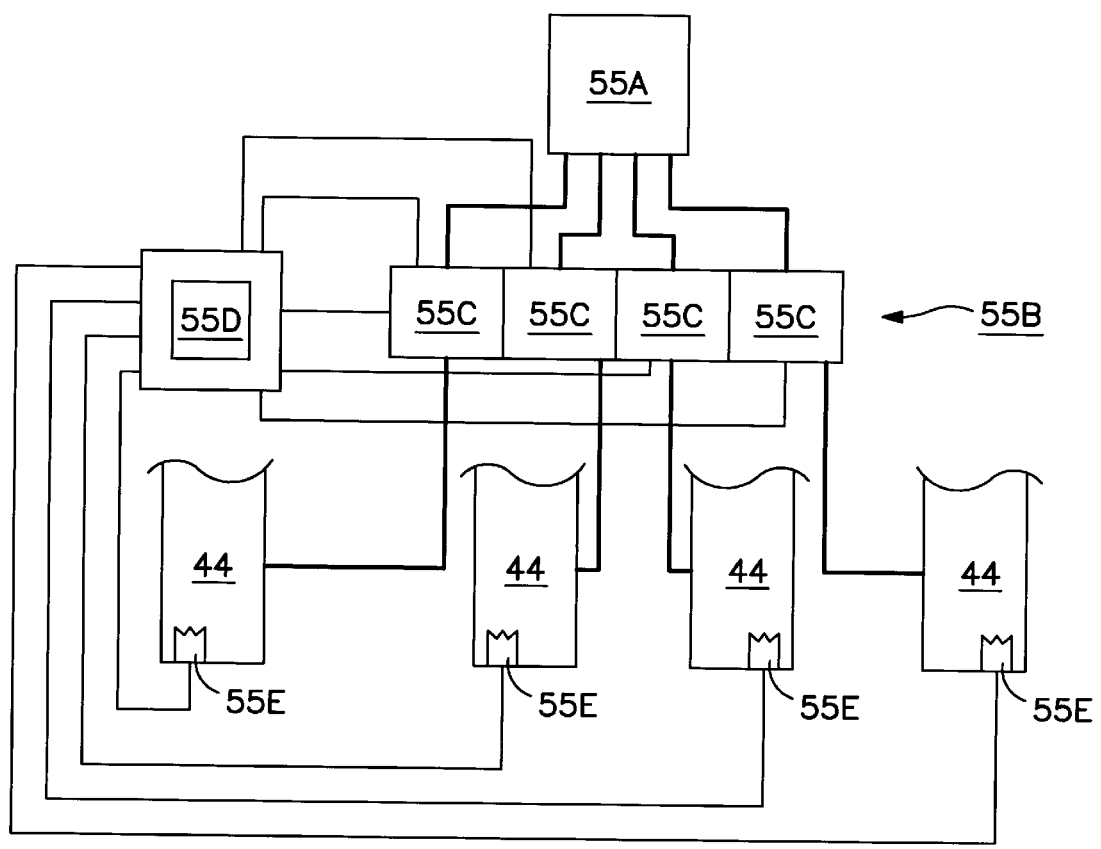

FIG. 4B is a modification of FIG. 4A showing a horizontal shear plate 65 secured to horizontal rails 64. Shear plate 65 improves the rigidity of the cantilever section 50 supporting the engine 52.

FIG. 4B also shows additional support of the engine-bearing cantilever provided by a pair of "hanger columns 67, each having an upper end secured to the respective end of yoke 30. The bottom end of each column 67 is attached to a respective horizontal beam 54. The force in column 67 is tensile. The engine is not shown in FIG. 4B.

FIG. 4A shows a similar cantilever support positioned on the front end of the carrier section 24 for carrying the cab module. Containing the operators and truck crew.

There is shown the cantilever 60 extending away from the carrier section 24. The cab 62 is shown in phantom. The cantilever 60 for the cab includes a pair of horizontal beams 64, each having one end abuttedly attached to the rear axle 38 and the other end secured to one end of one of a pair of oblique members 68 whose other end is secured to the nearest end of one of the yokes 30. The other oblique member 68 is similarly attached to the other horizontal beam 64 and other yoke 30.

Figure 8:
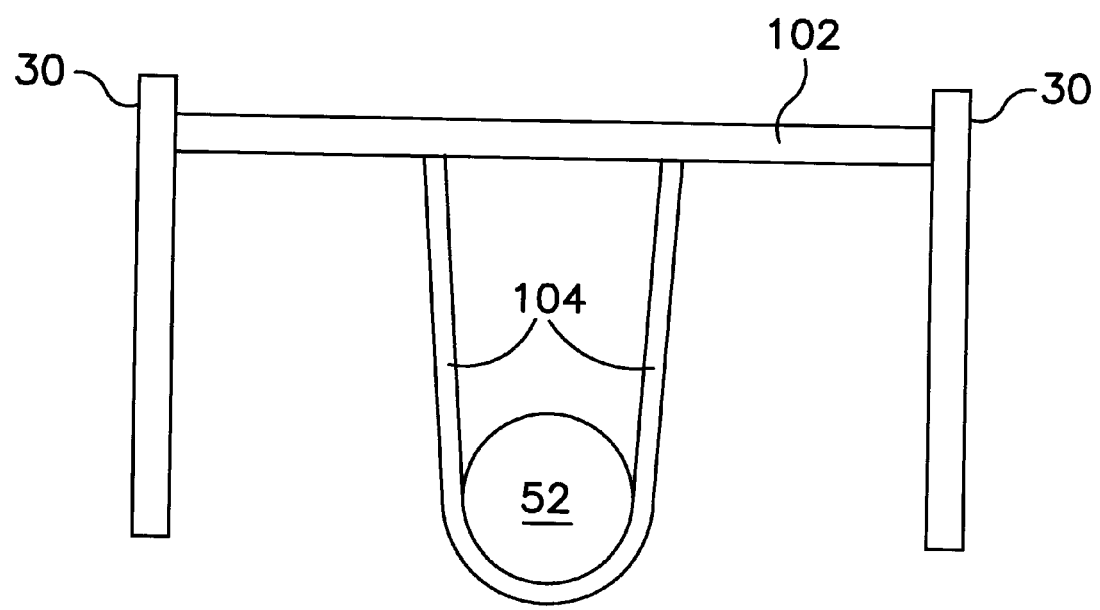
FIG. 8 shows an arrangement for supporting the engine.

FIG. 4A also shows an engine hanger 59 illustrated to best advantage in the cutaway view of FIG. 8. There are shown an end view of each yoke 30 with a cross member 102 to which are attached the upper ends of hanger members 104. The lower ends of the hangers are attached to the engine 52.

This arrangement provides that most of the weight of the engine 52 is transferred as a tensile force to the oblique members 58 and thereby effects a substantial reduction in weight of the cantilever 60.

FIG. 5 is a side view of the truck of FIG. 1 with the cab shield and engine hood removed to illustrate the forces imposed in the various members to support the engine 52, cab 62 and tank 28. A sectional view of the engine hood 70 is shown. The engine hood 70 acts as scoop which directs the air current (arrow A) generated by forward motion (arrow B) of the truck to flow rearward under the truck through radiator 52 C to cool the motor 52B. Another air stream generated by the forward motion of the truck enters the engine section through louvers 69 in the side of the hood shown in FIG. 2. The air stream passes out through vents 57 (FIG. 2) on top of the hood.

Figure 11:
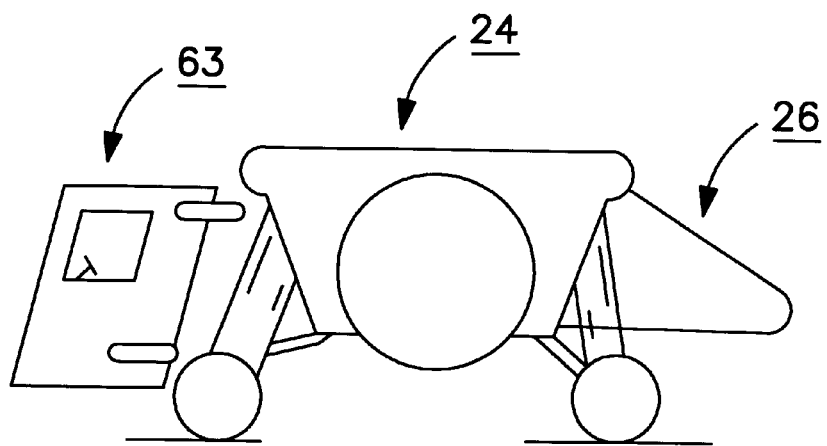
FIG. 11 shows the cab module mountable on the carrier.

FIG. 11 is an exploded view of another version for mounting a cab module on the front of the carrier section (in place of the cantilever support shown in FIG. 5. According to this arrangement, the cab section is a unitary shell 63 (or form) that is attached as a whole onto the front end of the carrier section. 24.

FIGS. 4A and 5 show a fan 52E that is controlled by temperature sensors (not shown) to turn on automatically when the airstream generated by motion of the truck is insufficient.

In a typical construction according to the present invention, the height of the contact of the upper end of the cylinder 34 and the yoke 30 is greater than six feet in order to hang a water tank that is five feet in diameter.

The "hanging support construction illustrated in FIG. 5 also provides an inherently low center of gravity 37 when the tank is full in contrast to the state of the art construction shown in FIG. 1. The low center of gravity provides that the stability of the truck is substantially greater than trucks of the prior art.

FIG. 6 shows the yoke 30 reinforced by the weld through the tank to the baffle 31 to adequately resist the bending moment imposed by the weight of the fluid in tank 28. The tank hangs from the yoke so that the predominant force in the yoke (which includes the baffle and tank) is a tensile force in the plane of the yoke. The compressive force imposed by the weight of the tank is on the rams 34 of hydraulic cylinders 36 and 44 so that the entire support structure for the tank is characterized by a large supporting strength to weight ratio.

FIG. 5 also illustrates that the major force supporting the engine and cab are the oblique members, 58 and 68, which are subject to tensile, stress rather than compressive stress. Tensile stress is preferred because tendency to buckle is avoided. Therefore, a lighter oblique member can be used resulting in a substantial reduction of weight. Furthermore, the centers of gravity of the engine and cab are lower to the ground when using the hanging structure of this invention compared to the beam support structure of the prior art illustrated in FIG. 1.

Figure 7:
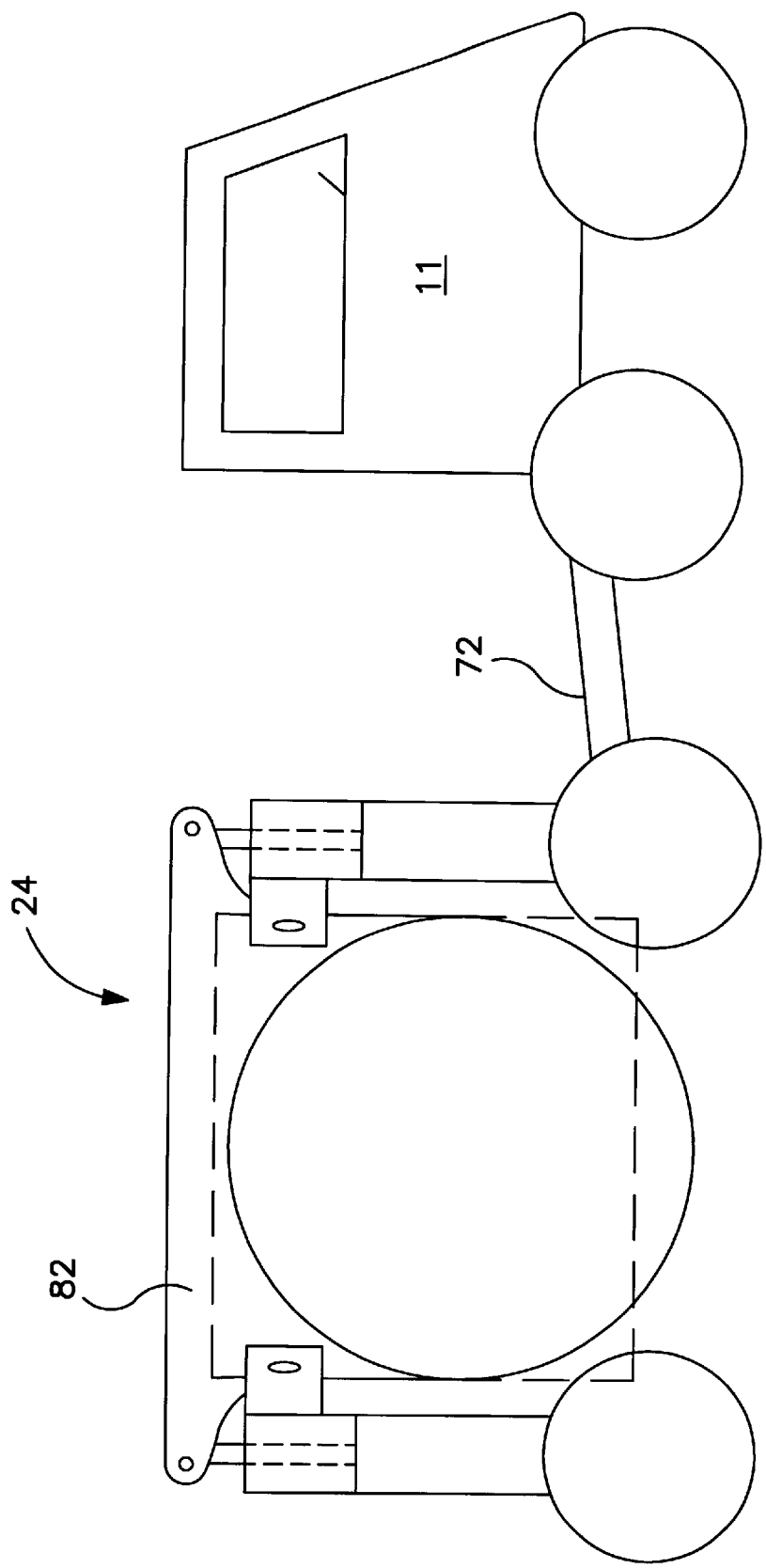
FIG. 7 shows the carrier section attachable to a truck tractor.

There have been described examples of a transport device of carrying a load including means for coupling the device to a motor means for moving the load. In one embodiment, the transport device is coupled to a truck tractor. (FIG. 7). In another embodiment, the transport device is coupled to an engine mounted on the transport device. (FIG. 2)

An important feature of this transport device is suspension of the load (e.g., a tank of water) from a pair of yokes whose ends are supported directly on the front and rear axles through vertical hydraulic cylinders.

This arrangement has the advantage of an inherently low center of gravity and predominantly tensile stresses in the supporting members, which militate against buckling and permit use of lighter support members.

The embodiment of FIG. 7 is especially adaptable to a situation where it is required to move a plurality of containers such as the "containers" that are presently hauled on the beds o trucks, railroad flat cars, the dumpsters that are used to haul trash by truck.

According to this application, a front and rear axle with hydraulic cylinders mounted thereon, are wheeled into position on the forward and rearward end of the container and attached to the container as shown in FIG. 7. Then the hydraulic cylinders are simultaneously pressurized thereby lifting the container off the ground. Then the tongue is attached to the motorized vehicle 11 in preparation for towing the carrier section to its destination.

Variations and modifications of this invention may be contemplated which are within the scope of this invention, especially after reading the specification and studying the drawings.

For example, the tank in each of the embodiments of FIG. 2 and FIG. 7 is a cylinder having an axis perpendicular to the direction of travel. However, in other embodiments, the tank has another shape such as a box 82 illustrated in phantom in FIG. 7. (A box is defined as a container having a rectangular bottom, four perpendicular sides, and a rectangular top.

Figure 9A:
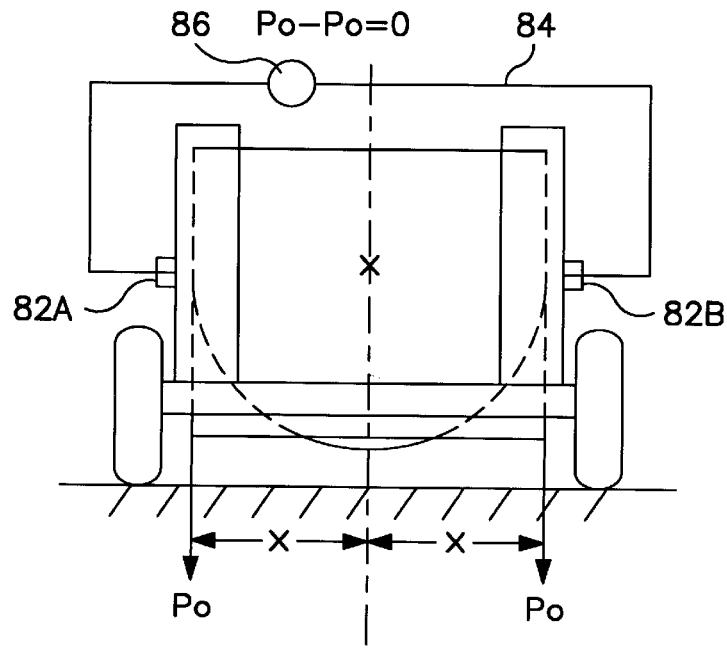
FIGS. 9A and 9B show the arrangements of a pressure sensor system for equalizing the load by computing tilt.
Figure 9B:
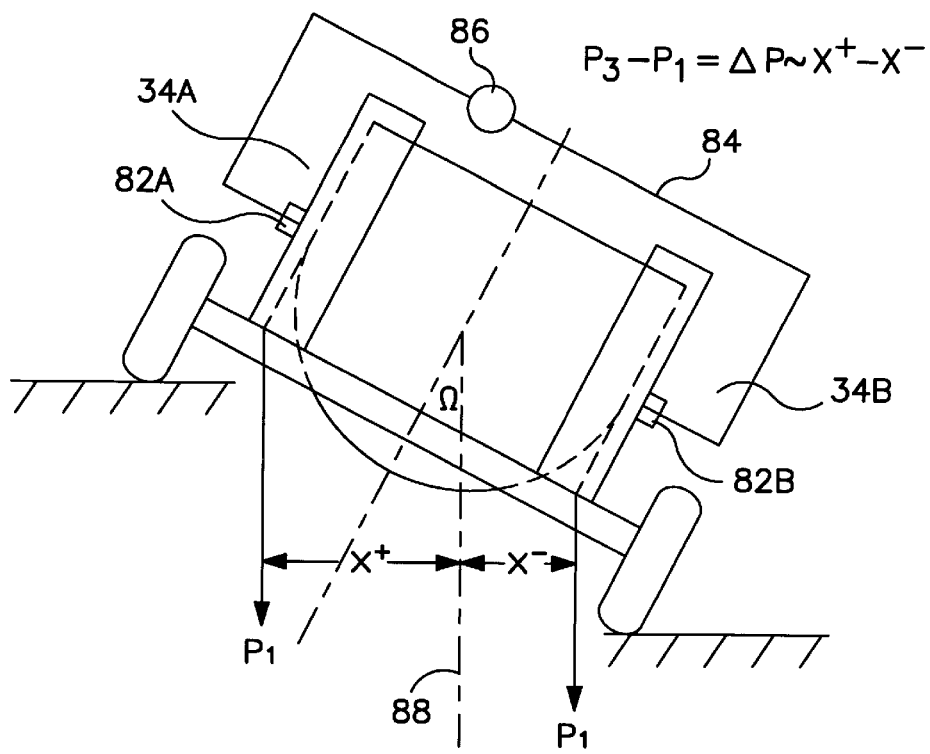

In one version of the invention, the pump 55 is provided as a permanent part of the truck. In another embodiment, a pump 55 is attached to the cylinders only when it is required to pressurize the cylinders after which, the pump is disconnected, FIGS. 9A and 9B illustrate an embodiment of the controls, which monitors for inspection by the operator the tilt of the truck when the truck is travelling over uneven terrain. There are shown pressure sensor 82A and pressure sensor 82B, which measure pressure on respective hydraulic cylinders 34A and 34B. The pressure readings are transmitted over line 84 to computer 86 which computes angle of tilt Ø from the difference of pressure readings, $dP=P^+-P^-$ As illustrated in FIGS. 9A and 9B, The pressure difference arises as a result of the shift of the center line 88 as the truck is tilted on the uneven terrain.

In various modifications, the tanks are a metal, e.g., steel, aluminum, or plastic, e.g., polypropylene, polyethylene, fiberglass, etc.

FIG. 5 shows a variation of the invention including a boom 90 comprising two arms 92 pivotally attached to both ends of axle 46. The arms 92 are joined at an apex 94 to form an arched boom. The boom is raised or lowered by a cable 96 having an end attached to the apex of the boom and another end extending over a pulley 98 axially mounted between extending ends of yokes 30 and secured through a clutch to the motor shaft. (One arm, the clutch and attachment to the engine shaft are not shown. in FIG. 5.

In other embodiments, the carrier section is a flat bed suspended between the yokes so that the bed is close to the ground thereby lowering the center of gravity of any load carried on the flat bed.

The figs. show the bottom end of each cylinder mounted on the axle.

Figure 10:
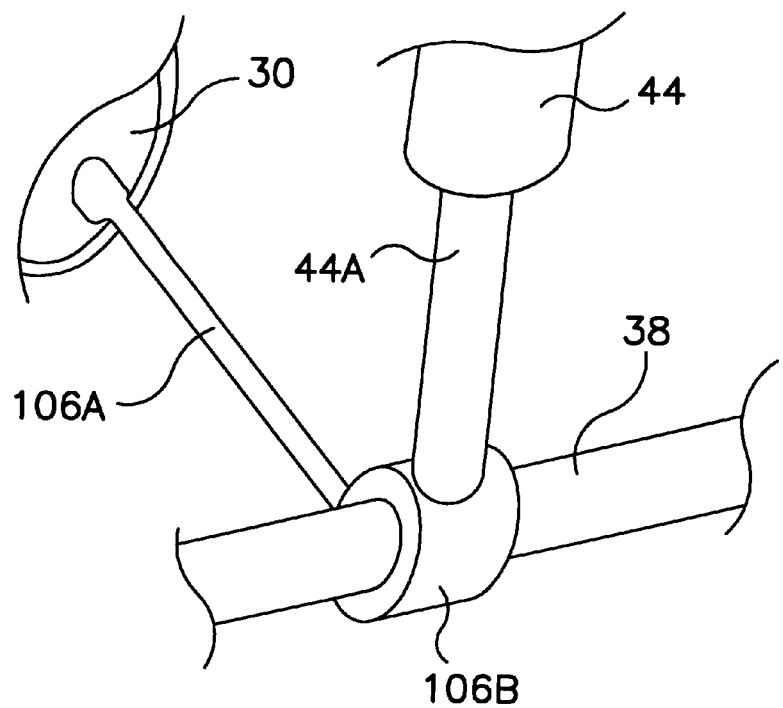
FIG. 10 shows the linkage between axle, ram and yoke.

FIG. 10 shows an arrangement of this invention for securing the cylinder 44 to the axle 38 to the bottom corner of the yoke 30 and the cylinder 44 by a linkage. The linkage includes a collar 106B mounted on the axle 38. The ram 44A extends from the bottom end of cylinder 44. And is secured to the collar 106B. A stabilizing rod 106A extends from the collar 106B to the lower corner of the yoke30.

The tank version of the invention is particularly suited to carrying fluids, which includes any one of liquids or granulated solids. Examples of liquids transportable by the invention include water or petroleum products such as oil, gasoline, alcohol, etc. Examples of granulated solids transportable by the invention include sand, pebbles, sugar, etc.

The scope of the invention is defined by the appended claims.

What is claimed is:

1. A transport device for hauling a load which comprises:
   a container means adapted for containing said load;
   a front axle with a pair of wheels;
   one of said pair of wheels mounted on one end of said front axle and another one of said wheels mounted on an opposite end of said front axle;
   a rear axle with another pair of wheels;
   one of said another pair of wheels mounted on one end of said rear axle and another one of said another pair of wheels mounted on an opposite end of said rear axle;
   four hydraulic cylinders, each cylinder having a top end and a bottom end and having a ram located at one of said top end and said bottom end;
   means for supportively securing a bottom end of a first one of said four cylinders to said front axle adjacent one wheel and means for supportively securing a second one of said four cylinders to said front axle adjacent said one wheel of said another pair of wheels;
   means for supportively securing a bottom end of a third one of said four cylinders to said rear axle adjacent said one of another pair of wheels and for supportively securing a bottom of a fourth one of said four cylinders to said rear axle adjacent said another one of said another pair of wheels;
   a pump means coupled to said four cylinders for maintaining hydraulic pressure in said hydraulic cylinders;
   a pair of yokes arranged substantially parallel to one another;
   one yoke of said pair of yokes having one end secured to a top end of said first hydraulic cylinder and another end secured to a top end of said third hydraulic cylinder;
   another yoke of said pair of yokes having one end secured to a top end of said second hydraulic cylinder and another end secured to a top end of said fourth hydraulic cylinder;
   means for hanging said container means from said pair of yokes;
   means adapted for coupling said transport device to a motor means for moving said transport device.

2. The transport device of claim 1 wherein said container is a tank.

3. The transport device of claim 2 wherein said tank is cylindrical.

4. The transport device of claim 2 wherein said tank is rectangular.

5. The transport device of claim 2 wherein each one of said pair of yokes comprises:

a panel;

said panel having a cutout shaped to provide that said yoke straddles said tank wherein a cutout edge of said panel abuts against and is welded to an outside surface of said tank;

each panel comprising one of said yokes weldedly mounted on said outside surface of said tank being substantially parallel to said other panel proximal to an end of said tank opposite said other panel on an opposite end of said tank.

6. The transport device of claim 5 which comprises:

a pair of baffles, each baffle having an edge;

said edge of one of said baffles welded to an inside surface of said tank coplanar with one of said yokes;

said edge of another one of said baffles welded to an inside surface of said tank coplanar with another one of said yokes;

each one of said baffles having at least one opening to permit flow of said fluid load inside said tank.

7. The transport device of claim 2 wherein said tank is made of a metal selected from a group of metals that consists of steel and aluminum.

8. The transport device of claim 2 wherein said tank is made of a plastic selected from a group of plastics that consists of polypropylene, polyethylene, and fiber glass.

9. The transport device of claim 1 wherein said motor means is a truck tractor and said means adapted for coupling said transport device to a motor means for moving said transport device comprises a tongue having one end attached to said axle and another end adapted for attachment to said truck tractor.

10. The transport device of claim 1 wherein:

said motor means is a truck engine and said means adapted for coupling said transport device to a motor means for moving said transport device comprises:

a rear cantilever structure secured to said pair of yokes and said rear axle and extending rearward from said rear axle configured for mounting said truck engine on said rear cantilever structure to enable engaging said truck engine with said rear axle; and said device further comprises:

cab means for housing operators of said transport device mounted on a front end of said carrier.

11. The transport device of claim 10 wherein said rear cantilever structure comprises:

a pair of horizontal beams, one of said horizontal beams having one end secured to said rear axle adjacent one of said wheels on said rear axle and another one of said horizontal beams secured to said rear axle adjacent another one of said wheels on said front axle;

a pair of oblique beams, one of said oblique beams having: one end secured to a front end of one of said pair of yokes and another end secured to an extending end of one of said horizontal beams and another one of said oblique member having; one end secured to a front end of another one of said pair of yokes and another end secured to an extending end of another one of said horizontal beams said pair of horizontal beams and oblique beams extending in a rearward direction from said rear axle;

said truck engine arranged in operable combination with said horizontal and oblique pairs of beams to provide that said truck engine, coupled to said rear wheels is mounted on said pair of horizontal beams supported by said oblique beams.

12. The transport device of claim 11 comprising a pair of hanger columns, each having an upper end secured to the respective end of said yoke, with a bottom end of each column attached to a respective horizontal beam 54 of said rear cantilever means for supporting said engine whereby further support to hanging said engine is provided.

13. The transport device of claim 12 wherein said control means further comprises:

four pressure sensors, each one of said sensors mounted on one of said hydraulic cylinders respectively for sensing hydraulic pressure in each one of said cylinders;

computer means for displaying tilt of said transport device from said sensors sensing hydraulic pressure in each one of said cylinders.

14. The transport device of claim 11 wherein said rear cantilever structure comprises: a horizontal shear plate secured along one edge to one of said horizontal parallel beams opposite another edge secured to another one of said horizontal parallel beams whereby said shear plate improves the rigidity of the cantilever structure supporting the engine.

15. The transport device of claim 14 wherein said cab means is a cab module attachable to a front end of said carrier.

16. The transport device of claim 14 wherein said cab module is selectable from a group of cab modules having a range of sizes.

17. The transport device of claim 10 which further comprises:

a bar extending from a top forward end of one said yoke to a top forward end of another said yoke;

a pair of strap hangers, each having one end attached to said bar and another end attached to another side of said engine opposite said one side.

18. The transport device of claim 10 comprising a hood for said engine secured to said oblique beams and extending from over a top of said engine; around a rear end of said transport device to underneath said engine operably arranged to scoop air when said transport device is moving in a forward direction and direct said air through a region occupied by said engine and out through vents in said hood.

19. The transport device of claim 10 wherein said cab means is selectable from a group of cab means having a range of sizes.

20. The transport device of claim 10 wherein said front cantilever means comprises:

a pair of horizontal beams, one of said horizontal beams having one end secured to said front axle adjacent one of said wheels on said front axle and another one of said horizontal beams secured to said front axle adjacent another one of said wheels on said front axle;

a pair of oblique beams, one of said oblique beams having one end secured to a front end of one of said pair of yokes and another end secured to an extending end of one of said horizontal beams and another one of said oblique member having one end secured to a front end of another one of said pair of yokes and another end secured to an extending end of another one of said horizontal beams said pair of horizontal beams and oblique beams extending in a forward direction from said front axle;

said cab arranged in operable combination with said horizontal and oblique pairs of beams to provide that said cab structure be mounted on said horizontal beams supported by said oblique beams.

21. The transport device of claim 20 wherein said cab means is selectable from a group of cab means having a range of sizes.

22. The transport device of claim 10 wherein said cab means is a cab module selectable from a group of cab modules having a range of sizes.

23. The transport device of claim 10 wherein said control means comprises:
a steering wheel mounted in said cab and coupled to said front wheels for enabling one of said at least one operators to steer said transport device.

24. The transport device of claim 10 comprising:
two arms 92 pivotally attached to both ends of said front axle;
said arms joined at an apex to form a boom;
a cable having one end attached to said apex of said boom
a pulley 98 axially mounted between extending ends of said yokes:
a clutch having a shaft engaging said cable on one end and engaging said motor shaft on another end in operable arrangement to raise and lower said boom by winding and unwinding said cable from said shaft of said clutch.

25. The device of claim 10 wherein:
said means for supportively securing an extending of each said ram to said respective axle comprises:
a collar mounted on said axle;
said extending end of said ram attached to said collar;
a link rod having one end attached to said collar and another end attached to an adjacent lower edge of a respective yoke.

26. The transport device of claim 1 wherein said motor means is a truck engine and said transport device comprises:
a front cantilever structure secured to said pair of yokes and said front axle and extending forward from said front axle configured for mounting a cab means for transporting at least one operator in said cab means in said cab means,
control means accessible to said at least one operator coupled to said engine for controlling motion of said engine.

27. The transport device of claim 1 wherein said load and container means has a center of gravity and said center of gravity is below said pair of yokes.

28. A transport device for hauling a fluid load which comprises:
a cylindrical tank adapted for containing said load;
a front axle with a pair of wheels;
one of said pair of wheels mounted on one end of said front axle and another one of said wheels mounted on an opposite end of said axle;
a rear axle with another pair of wheels;
one of said another pair of wheels mounted on one end of said rear axle and another one of said another pair of wheels mounted on an opposite end of said rear axle;
said cylindrical tank having a horizontal axis oriented parallel to said front and rear axles;
four hydraulic cylinders, each cylinder having a top end and a bottom end and having a ram extending out of said top end;
a first one of said four cylinders supported by its bottom end mounted on said front axle adjacent one wheel and a second one of said four cylinders supported by its bottom end mounted on said front axle adjacent said another wheel;
a third one of said four cylinders supported by its bottom end mounted on said rear axle adjacent said one of another pair of wheels and a fourth one of said four cylinders supported by its bottom end mounted on said rear axle adjacent said another one of said another pair of wheels;
a pump means coupled to said four cylinders for maintaining hydraulic
pressure in said hydraulic cylinders;
a pair of yokes, each yoke being a panel arranged substantially parallel to one another;
each said panel having a cutout shaped to provide that said panel straddles said tank wherein a cutout edge of each said panel abuts against and is welded to an outside surface of said tank proximal to one end of said tank opposite said other panel welded to said tank proximal to an opposite end of said tank;
each panel comprising one of said yokes being substantially parallel to said other panel;
a pair of baffles, each baffle having an edge;
said edge of one of said baffles welded to an inside surface of said tank coplanar with one of said panels;
said edge of another one of said baffles welded to said inside surface of said tank coplanar with another one of said panels;
each one of said baffles having at least one opening to permit flow of any fluid load inside said tank;
one of said pair of yokes being said pair of panels and having one end secured to a free end of said ram extending from said first hydraulic cylinder and another end secured to a free end of said ram extending from said third hydraulic cylinder;
another one of said pair of yokes having one end secured to a free end of said ram extending from said second hydraulic cylinder and another end secured to a free end of said ram extending from said fourth hydraulic cylinder;
a rear cantilever structure secured to said pair of yokes and said rear axle and extending rearward from said rear axle;
said rear cantilever structure adapted for supporting a truck engine coupled to said rear axle;
a front cantilever structure secured to said pair of yokes and said front axle and extending forward from said front axle configured for mounting a cab means for transporting at least one operator in said cab means;
control means accessible to said at least one operator coupled to said engine for controlling motion of said engine;
four pressure sensors, each one of said sensors mounted on one of said hydraulic cylinders respectively for generating a pressure signal responsive to hydraulic pressure in each one of said hydraulic cylinders;
computer means for computing tilt of said transport device from said pressure signals.

29. A transport device for hauling a load which comprises:
a container means adapted for containing said load;
a front axle with a pair of wheels;
one of said pair of wheels mounted on one end of said front axle and another one of said wheels mounted on an opposite end of said axle;
a rear axle with another pair of wheels;
one of said another pair of wheels mounted on one end of said front axle and another one of said another pair of wheels mounted on an opposite end of said rear axle;

four hydraulic cylinders, each cylinder having a top end and a bottom end and having a ram extending out of said top end;

a first one of said four cylinders having means for supportively securing its bottom end to said front axle adjacent one wheel and a second one of said four cylinders supportively securing its bottom end to said front axle adjacent said another wheel;

a third one of said four cylinders having means for supportively securing its bottom end to said rear axle adjacent said one of another pair of wheels and a fourth one of said four cylinders having means for supportively securing its bottom end to said rear axle adjacent said another one of said another pair of wheels;

said four cylinders adapted for coupling to a pump means for pressurizing said hydraulic cylinders;

a pair of yokes arranged substantially parallel to one another;

one of said pair of yokes having one end secured to a top end of said first hydraulic cylinder and another end secured to a top end said ram said third hydraulic cylinder;

another one of said pair of yokes having one end secured to a top end of said second hydraulic cylinder and another end secured to a top end of said fourth hydraulic cylinder;

means for hanging said container means from said pair of yokes;

means adapted for coupling said transport device to a motor means for moving said transport device.

30. The transport device of claim 29 wherein said motor means is a truck tractor.

31. The transport device of claim 30 wherein said load is any one of a liquid, and a granulated compound.

32. A transport device for hauling a load which comprises:

a container means adapted for containing said load;

a front axle with a pair of wheels;

one of said pair of wheels mounted on one end of said front axle and another one of said wheels mounted on an opposite end of said axle;

a rear axle with another pair of wheels;

one of said another pair of wheels mounted on one end of said rear axle and another one of said another pair of wheels mounted on an opposite end of said rear axle;

a pair of yokes arranged substantially parallel to one another;

one of said pair of yokes having one end supported on said front axle adjacent one said wheel of said pair of wheels mounted on said front axle and another end supported on said rear axle adjacent another wheel of said pair of wheels on said rear axle;

another one of said pair of yokes having one end supported on said front axle adjacent another wheel of said pair of wheels mounted on said front axle and another end supported on said rear axle adjacent another wheel of said pair of wheels on said rear axle;

means for hanging said container means from said pair of yokes;

means adapted for coupling said transport device to a motor means for moving said transport device.

33. The transport device of claim 22 wherein said motor means comprises a truck engine mounted on said transport device.

34. The transport device of claim 22 wherein said load and container means has a center of gravity and said center of gravity is below said pair of yokes.

35. A transport device for hauling a load which comprises:

a container means adapted for containing said load;

at least one front axle, each said at least one front axle having a pair of wheels;

one of said pair of wheels mounted on one end of said at least one front axle and another one of said wheels mounted on an opposite end of said a least one front axle at least one rear axle, each said at least one rear axle having another pair of wheels;

one of said another pair of wheels mounted on one end of said at least one axle and another one of said wheels mounted on an opposite end of said at least one rear axle;

a plurality of hydraulic cylinders, two cylinders for each of said at least one front axle and for each of said at least one rear axle;

each cylinder having a ram extending out of a bottom end of said cylinder;

means for supportively securing an extending end of each said ram to its respective axle adjacent one of said wheels;

a pair of yokes arranged substantially parallel to one another;

each one of said pair of yokes having each end supportively secured to a top end of said at least one hydraulic cylinder;

means for hanging said container means from said pair of yokes;

a pump system coupled to each one of said plurality of hydraulic cylinders for maintaining hydraulic pressure in said hydraulic cylinders;

means adapted for coupling said transport device to a motor means for moving said transport device.

36. The transport device of claim 35 wherein said pump system comprises:

a pump;

a valve assembly communicating with said pump and having a plurality of valves, one valve for each cylinder and communicating with said each cylinder;

a plurality of pressure and position sensors, one pressure sensor for each cylinder arranged to generate pressure and position signals responsive in pressure in and extension of said each cylinder respectively;

a computer arranged to receive said pressure and position signal and adjust a pressure in a corresponding cylinder whereby pressure distribution in said plurality of cylinders is accommodated to road conditions of said transport device.

* * * * *